(12) United States Patent
Gadkaree et al.

(10) Patent No.: US 8,496,734 B2
(45) Date of Patent: Jul. 30, 2013

(54) SORBENT STRUCTURE APPLICABLE FOR CARBON DIOXIDE CAPTURE

(75) Inventors: Kishor Purushottam Gadkaree, Big Flats, NY (US); Youchun Shi, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 346 days.

(21) Appl. No.: 12/393,239

(22) Filed: Feb. 26, 2009

(65) Prior Publication Data

US 2010/0212495 A1 Aug. 26, 2010

(51) Int. Cl.
*B01D 53/02* (2006.01)

(52) U.S. Cl.
USPC .......... 95/139; 95/78; 95/116; 95/134; 96/27; 96/66; 502/400; 502/401; 502/416; 502/418; 502/437

(58) Field of Classification Search
USPC ..... 95/78, 116, 134, 139; 96/27, 66; 502/400, 502/401, 416, 418, 437
See application file for complete search history.

(56) References Cited

U.S. PATENT DOCUMENTS

| | | | |
|---|---|---|---|
| 4,810,266 A | 3/1989 | Zinnen et al. | 55/68 |
| 5,750,026 A | 5/1998 | Gadkaree et al. | 210/502.1 |
| 5,820,967 A | 10/1998 | Gadkaree | 428/116 |
| 5,998,328 A | 12/1999 | Dawes et al. | 502/182 |
| 6,097,011 A | 8/2000 | Gadkaree et al. | 219/553 |
| 6,156,697 A | 12/2000 | Gadkaree | 502/427 |
| 6,171,372 B1 | 1/2001 | Ichiki et al. | 95/129 |
| 6,187,713 B1 | 2/2001 | Gadkaree | 502/425 |
| 6,228,803 B1 | 5/2001 | Gadkaree et al. | 502/416 |
| 6,248,691 B1 | 6/2001 | Gadkaree et al. | 502/423 |
| 6,372,289 B1 | 4/2002 | Hickman | 427/228 |
| 7,077,891 B2 | 7/2006 | Jaffe et al. | 96/108 |
| 7,141,092 B1 | 11/2006 | Roychoudhury et al. | 95/90 |
| 7,314,847 B1 | 1/2008 | Siriwardane | 502/400 |
| 7,316,731 B2 | 1/2008 | Farant et al. | 95/106 |
| 2002/0056686 A1 | 5/2002 | Kyrlidis et al. | 210/656 |
| 2005/0230659 A1 | 10/2005 | Hampden-Smith et al. | 252/189 |
| 2006/0148642 A1 | 7/2006 | Ryu et al. | 502/84 |
| 2007/0264179 A1 | 11/2007 | Gadkaree et al. | 423/109 |

(Continued)

FOREIGN PATENT DOCUMENTS

| | | |
|---|---|---|
| EP | 0684071 | 5/1995 |
| EP | 0696473 | 7/1995 |

(Continued)

OTHER PUBLICATIONS

"A novel process for $CO_2/CH_4$ gas separation on activated carbon fibers-electric swing adsorption"; Moon et al; Science Direct; Journal of Colloid and Interface Science 298 (2006) 523-528.

(Continued)

*Primary Examiner* — Christopher P Jones

(74) *Attorney, Agent, or Firm* — Jason A. Barron; Lisa M. Noni; Steven J. Scott

(57) ABSTRACT

A sorbent structure comprising a continuous activated carbon body in the form of a flow-through substrate; and an additive provided on the flow-through substrate, wherein the additive is capable of enhancing the sorption of $CO_2$ on the sorbent structure. Methods of making the sorbent structure, its use for $CO_2$ capture, and methods for regenerating the structure for further use.

23 Claims, 2 Drawing Sheets

U.S. PATENT DOCUMENTS

| | | | |
|---|---|---|---|
| 2007/0265161 A1 | 11/2007 | Gadkaree et al. | 502/417 |
| 2008/0282885 A1 | 11/2008 | Deckman et al. | 95/98 |
| 2008/0282887 A1 | 11/2008 | Chance et al. | 95/98 |

FOREIGN PATENT DOCUMENTS

| | | |
|---|---|---|
| EP | 1371607 | 12/1998 |
| WO | 02/059039 | 8/2002 |
| WO | 2006/094411 | 9/2006 |
| WO | 2008/143826 | 11/2008 |

OTHER PUBLICATIONS

"Electrical Swing Regenerable Filtration Using Carbon Fibre Composites and Carbon Monoliths"; Chinn et al; Crown Copyright 2002 Dstl.

"Engineering Feasibility of $CO_2$ Capture on an Existing US Coal-Fired Power Plant"; Nsakala et al; for presentation at the First National Conference on Carbon Sequestration, May 15-17, 2001 in Washington, DC.

"The IPCC Special Report on Carbon Dioxide Capture and Storage"; Intergovernmental Panel on Climate Change (IPCC).

"$CO_2$ Capture with MEA: Integrating the Absorption Process and Steam Cycle of an Existing Coal-Fired Power Plant"; Colin Alie; Thesis presented to the University of Waterloo; 2004; Waterloo, Ontario, Canada.

"$CO_2$ Capture Systems Using Amine Enhanced Solid Sorbents"; Tarka et al; $5^{th}$ Annual Conference on Carbon Capture & Sequestration; NETL.

"$CO_2$ Capture Systems Utilizing Amine-Enriched Solid Sorbents"; Sep. 2005; Prepared by Thomas Tarka et al (Oct. 6, 2008).

"Carbon Sequestration Leadership Forum Technology Roadmap"; Barbara McKee; CSLF-T-2004-10; Sep. 28, 2004; Carbon Sequestration Leadership Forum.

"A Novel Carbon Electrode Material for Highly Improved EDLC Performance"; Fang et al; 2006 American Chemical Society; 7877-7882.

"Electrochemical Derivatization of Carbon Surface by Reduction of in Situ Generated Diazonium Cations"; Baranton et al; 2005 American Chemical Society; 24401-24410.

"Removal of Formaldehyde by Activated Carbons Containing Amino Groups"; Tanada, et al; Journal of Colloid and Interface Science 214; 106-108 (1999).

"Electric Swing Adsorption for $CO_2$ removal from flue gases"; International Journal of Greenhouse Gas Control 2 (2008) 194-202.

Fuel 85; Electrically regenerable mesoporous carbon for $CO_2$ capture; Delaney et al; The $231^{st}$ ACS National Meeting, Atlanta, GA, Mar. 26-30, 2006.

Fuel 67; "High capacity adsorbents for $CO_2$ capture in gasification"; Blackman et al; The $231^{st}$ ACS National Meeting, Atlanta, GA, Mar. 26-30, 2006.

SORBENT STRUCTURE APPLICABLE FOR CARBON DIOXIDE CAPTURE

FIELD OF THE DISCLOSURE

This disclosure relates to a sorbent structure, such as a honeycomb, useful in the removal of carbon dioxide from a gas.

BACKGROUND

It has been widely acknowledged that carbon dioxide ($CO_2$) concentration has a strong correlation with global warming that increases the chances of natural disasters such as hurricane and flooding. Power plants contribute approximately one third of all $CO_2$ emissions related to human activities, with each power plant capable of emitting a million tons of $CO_2$. In addition, other industries, such as oil refineries, cement works, and iron and steel production processes, also emit large amounts of $CO_2$ from each plant. These emissions could be reduced substantially, without major changes to the basic process, by capturing and storing the $CO_2$.

$CO_2$ emissions can be reduced in many ways, such as increasing the efficiency of power plants or by switching coal to natural gas. However, these methods alone will not achieve the desirable $CO_2$ emission level. Since a significant amount of $CO_2$ emission comes from fossil fuel combustion, sequestration of $CO_2$ from fossil fuel combustion could play an important role in control of total $CO_2$ emission levels. Sequestration of $CO_2$ refers to the technologies of capturing $CO_2$ emitted from a source and then securely storing the captured $CO_2$ that can stay for hundreds or even thousands of years. Reservoirs under the earths surface and in the oceans such as depleted oil and gas reservoirs, deep saline aquifers, and unminable coal seams are the common places used for $CO_2$ storage today.

In terms of $CO_2$ capture generated from combustion of a primary fossil fuel, there are three main approaches: post-combustion, pre-combustion and oxyfuel combustion. Pre-combustion $CO_2$ capture is used for fossil fuel gasification that coverts the fuel to carbon monoxide and hydrogen first, and then, the carbon monoxide reacts with steam in a second reactor (a "shift reactor") to generate additional hydrogen and $CO_2$. Finally, the $CO_2$ gas is separated from hydrogen that is a carbon-free energy carrier and can be combusted to generate power and/or heat. The pre-combustion method would be suitable for power plants employing integrated gasification combined cycle (IGCC) technology.

The oxyfuel combustion method does not use the air but uses oxygen separated from the air as the fuel combustion oxidant. The oxygen rich combustion results in high $CO_2$ concentration (greater than 80% by volume) and water vapor. Water vapor can be condensed by cooling and compressing the gas stream, and what is left is mainly $CO_2$. The requirement of oxygen separation from the air reduces the energy efficiency for oxyfuel combustion system. In addition, the oxyfuel combustion system also needs to remove air pollutants and non-condensed gases (such as nitrogen) from the flue gas before $CO_2$ is sent to storage. Boiler systems using oxy-fuel combustion are in the demonstration phase.

An advantage of the post-combustion $CO_2$ capture is that it is easy to retrofit the $CO_2$ capture system without major changes of the boiler designs. For a modern coal-fired power plant or a natural gas combined cycle (NGCC) power plant, a liquid solvent $CO_2$ capture system is commonly used as the post-combustion $CO_2$ capture solution, which typically uses an organic amine such as monoethanolamine (MEA) to capture $CO_2$ (typically 3-15% by volume in a flue gas stream). The system is normally installed downstream of the $SO_2$ scrubber. Since $CO_2$ is an acidic gas or a weak acid, it is adsorbed via the reaction with MEA. This weak acid-weak base reaction is reversible, and $CO_2$ and MEA can be recovered upon heating. A typical system consists of an "absorber" where $CO_2$ is captured and a "stripper" where $CO_2$ is separated from MEA. Post-combustion systems can remove up to 95% of $CO_2$. MEA-based post-combustion $CO_2$ capture systems are commercially available but the system operation consumes a significant amount of energy. Other disadvantages of MEA-based systems are the corrosive and volatile natures of the organic base.

The inventors have now developed a new sorbent structure that may be used, for example, to remove $CO_2$ from a combustion flue gas stream of a coal-fired power plant or a NGCC power plant. Such a structure may provide, for example, low pressure drop, high surface area, and excellent energy efficiency for post-combustion $CO_2$ capture.

SUMMARY

A first embodiment is a sorbent structure comprising a continuous activated carbon body in the form of a flow-through substrate; and an additive provided on the flow-through substrate, wherein the additive is capable of enhancing the sorption of $CO_2$ on the sorbent structure.

A second embodiment is a method of making a sorbent structure that comprises providing a continuous activated carbon body in the form of a flow-through substrate; and applying to the flow-through substrate an additive, wherein the additive is capable of enhancing the sorption of $CO_2$ on the sorbent structure.

A third embodiment is a method of removing $CO_2$ from a gas that comprises providing the sorbent structure and contacting it with a gas comprising $CO_2$.

A fourth embodiment is a method of desorbing at least a portion of $CO_2$ from the sorbent structure, wherein the method comprises providing the sorbent structure having $CO_2$ sorbed thereon; and heating it to a temperature above the desorption temperature of the $CO_2$.

DESCRIPTION OF THE EMBODIMENTS

Figure 1A:
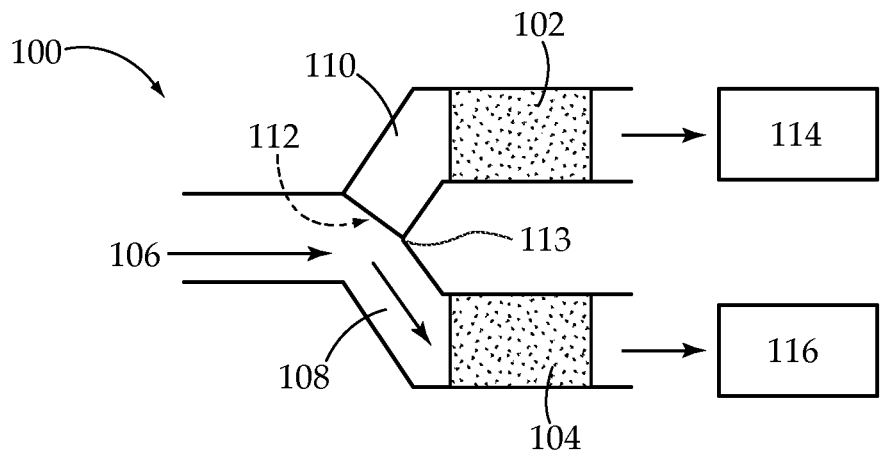
FIG. 1A is one embodiment of a system configuration for $CO_2$ removal and sorbent regeneration.

A first embodiment is a sorbent structure comprising a continuous activated carbon body in the form of a flow-through substrate; and an additive provided on the flow-through substrate, wherein the additive is capable of enhancing the sorption of $CO_2$ on the sorbent structure.

The term "continuous activated carbon body" refers to a continuous uninterrupted structure of carbon, as opposed to a mass of discontinuous carbon particles bound together by binders. As discussed further below, such a body may further comprise, in addition to the continuous activated carbon, any appropriate filler material such as inorganic or organic material and even particulate carbon. The continuous activated carbon body sorbent structure can be derived, for example, by converting a synthetic polymeric carbon-containing substance to a continuous carbon structure by carbonizing then activating the continuous carbon structure.

Continuous activated carbon bodies can have one or more advantages over bodies made from discontinuous activated carbon. Bodies made from activated carbon particles must be bound together by permanent binders; whereas resin-derived activated carbon bodies, for example, are made of continuous carbon and do not require permanent binders. The continuous carbon structure is strong and durable and can be used in high flow rate chemical processes. Such bodies also have durability in liquid streams. Bodies made from activated carbon particles may not be durable in organic solvents and in many cases even in water, since the binder holding the structure together is often water soluble.

The term "flow-through substrate" as used herein is a shaped body comprising inner passageways, such as straight or serpentine channels and/or porous networks that would permit the flow of a fluid stream through the body. The flow-through substrate comprises a dimension in the flow-through direction of at least 1 cm, at least 2 cm, at least 3 cm, at least 4 cm, at least 5 cm, at least 6 cm at least 7 cm, at least 8 cm, at least 9 cm, or at least 10 cm from the inlet end to the outlet end.

In one embodiment, the flow-through substrate has a honeycomb structure comprising an inlet end, an outlet end, and inner channels extending from the inlet end to the outlet end. In one embodiment, the honeycomb comprises a multiplicity of cells extending from the inlet end to the outlet end, the cells being defined by intersecting cell walls. The honeycomb substrate could optionally comprise one or more selectively plugged honeycomb substrate cell ends to provide a wall flow-through structure that allows for more intimate contact between the fluid stream and cell walls.

In one embodiment, the flow-through substrate comprises a surface having a surface area of 100 $m^2/g$ or more, 200 $m^2/g$ or more, 300 $m^2/g$ or more, 400 $m^2/g$ or more, or 500 $m^2/g$ or more.

In one embodiment, the flow-through substrate comprises a total pore volume wherein at least 20% of the total pore volume is comprised of pores having a pore diameter of 5 nanometers or more. In another embodiment, the flow-through substrate comprises a total pore volume wherein from 20% to 70% of the total pore volume is comprised of pores having a pore diameter in the range of 5 nanometers to 20 microns. In another embodiment, the flow-through substrate comprises a total pore volume wherein from 20% to 70% of the total pore volume is comprised of pores having a pore diameter in the range of 2 microns to 50 microns. The pores of the substrate material may create "interconnecting porosity" which is characterized by pores which connect into and/or intersect other pores to create a tortuous network of porosity within the substrate.

In one embodiment, the flow-through substrate comprises a cell density ranging from 6 cells per square inch (cpsi) to 1200 cpsi, for example, 50 cpsi to 900 cpsi, and for instance, 100 cpsi to 600 cpsi.

In one embodiment, the flow-through substrate comprises a channel wall thickness ranging from 0.001 inches to 0.050 inches, for example, 0.002 inches to 0.025 inches.

An additive is provided on the flow-through substrate, thereby enhancing the $CO_2$ sorption capability of the flow-through substrate. In one embodiment, the additive is a base. Weak bases may be most desirable in certain uses, as strong interactions between $CO_2$ and strong bases may cause difficulty for later desorption of the $CO_2$ from the sorbent structure. Organic and inorganic amines are examples of weak bases. Inorganic bases may also be provided as additives. Examples of inorganic bases include transition metal oxides, for instance, zinc oxide, iron oxide, or copper oxide. In some embodiments, organic or inorganic salt solutions, for example, aqueous solutions of nitrates, acetates, oxalates, citrates, maleates and succinates may be provided as additives.

In one embodiment, the flow-through substrate comprises an electrically conducting dopant material, such as one distributed throughout all or a portion of the flow-through substrate. In some embodiments, the dopant is distributed throughout the flow-through substrate by being intimately embedded within the substrate structure, as opposed to only disposed on exposed surfaces of the flow-through substrate. For example, within a honeycomb structure comprising a plurality of cells defined by porous cell walls, the dopant can be present within the cell walls (not only on the channel wall surfaces) and present within the structures defining the pores (not only on exposed pore surfaces).

Exemplary conducting materials are those that are oxidation resistant during $CO_2$ capture and sorbent structure regeneration processes. Example conducting materials include graphite, activated carbon, nickel metal powder, and titanium metal powder. The flow-through substrate may also comprise any appropriate filler material such as inorganic or organic material and even particulate carbon.

A second embodiment is a method of making a sorbent structure that comprises providing a continuous activated carbon body in the form of a flow-through substrate; and applying to the flow-through substrate an additive, wherein the additive is capable of enhancing the sorption of $CO_2$ on the sorbent structure.

The sorbent structure comprising a continuous activated carbon body may be made, for example, by providing a batch composition comprising a carbon precursor, forming the batch composition into the shape of a flow-through substrate, optionally curing the composition, carbonizing the composition, and activating the carbonized composition.

The carbon precursor used in the present method can include a single precursor material or a mixture of two or more precursor materials. Examples of carbon precursors include synthetic carbon-containing polymeric material. In one embodiment, the batch composition comprises an organic resin as a carbon precursor. Exemplary organic resins include thermosetting resins and thermoplastic resins (e.g., polyvinylidene chloride, polyvinyl chloride, polyvinyl alcohol, and the like). Synthetic polymeric material may be used, such as phenolic resins or a furfural alcohol based resins such as furan resins. Exemplary suitable phenolic resins are resole resins such as plyophen resins. An exemplary suitable furan liquid resin is Furcab-LP from QO Chemicals Inc., IN, U.S.A. An exemplary solid resin is solid phenolic resin or novolak.

The batch compositions may optionally also include inert inorganic fillers, (carbonizable or non-carbonizable) organic fillers, and/or binders. Inorganic fillers can include oxide glass; oxide ceramics; or other refractory materials. Exemplary inorganic fillers that can be used include oxygen-containing minerals or salts thereof, such as clays, zeolites, talc, etc., carbonates, such as calcium carbonate, alumninosilicates such as kaolin (an aluminosilicate clay), flyash (an aluminosilicate ash obtained after coal firing in power plants), silicates, e.g., wollastonite (calcium metasilicate), titanates, zirconates, zirconia, zirconia spinel, magnesium aluminum silicates, mullite, alumina, alumina trihydrate, boehmite, spinel, feldspar, attapulgites, and aluminosilicate fibers, cordierite powder, mullite, cordierite, silica, alumina, other oxide glass, other oxide ceramics, or other refractory material.

Additional fillers such as fugitive filler which may be burned off during carbonization to leave porosity behind or which may be leached out of the formed flow-through substrates to leave porosity behind, may be used. Examples of such fillers include polymeric beads, waxes, starch, and natural or synthetic materials of various varieties known in the art.

Exemplary organic binders include cellulose compounds. Cellulose compounds include cellulose ethers, such as methylcellulose, ethylhydroxy ethylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof. An example methylcellulose binder is METHOCEL A, sold by the Dow Chemical Company. Example hydroxypropyl methylcellulose binders include METHOCEL E, F, J, K, also sold by the Dow Chemical Company. Binders in the METHCEL 310 Series, also sold by the Dow Chemical Company, can also be used in the context of the invention. METHOCEL A4M is an example binder for use with a RAM extruder. METHOCEL F240C is an example binder for use with a twin screw extruder.

The batch composition may also optionally comprise forming aids. Exemplary forming aids include soaps, fatty acids, such as oleic, linoleic acid, sodium stearate, etc., polyoxyethylene stearate, etc. and combinations thereof. Other additives that can be useful for improving the extrusion and curing characteristics of the batch are phosphoric acid and oil. Exemplary oils include petroleum oils with molecular weights from 250 to 1000, containing paraffinic and/or aromatic and/or alicyclic compounds. Some useful oils are 3 in 1 oil from 3M Co., or 3 in 1 household oil from Reckitt and Coleman Inc., Wayne, N.J. Other useful oils can include synthetic oils based on poly (alpha olefins), esters, polyalkylene glycols, polybutenes, silicones, polyphenyl ether, CTFE oils, and other commercially available oils. Vegetable oils such as sunflower oil, sesame oil, peanut oil, soybean oil etc. are also useful.

The batch composition, such as one comprising a curable organic resin, may optionally be cured under any appropriate conditions. Curing can be performed, for example, in air at atmospheric pressures and typically by heating the composition at a temperature of from 70° C. to 200° C. for about 0.5 to about 5.0 hours. In certain embodiments, the composition is heated from a low temperature to a higher temperature in stages, for example, from 70° C., to 90° C., to 125° C., to 150° C., each temperature being held for a period of time. Additionally, curing can also be accomplished by adding a curing additive such as an acid additive at room temperature.

The composition can then be subjected to a carbonization step. For instance, the composition may be carbonized by subjecting it to an elevated carbonizing temperature in an $O_2$-depleted atmosphere. The carbonization temperature can range from 600° C. to 1200° C., in certain embodiments from 700° C. to 1000° C. The carbonizing atmosphere can be inert, comprising mainly a non reactive gas, such as $N_2$, Ne, Ar, mixtures thereof, and the like. At the carbonizing temperature in an $O_2$-depleted atmosphere, organic substances contained in the batch mixture body can decompose to leave a carbonaceous residue.

The carbonized composition may then be activated. The carbonized batch mixture body may be activated, for example, in a gaseous atmosphere selected from $CO_2$, $H_2O$, a mixture of $CO_2$ and $H_2O$, a mixture of $CO_2$ and nitrogen, a mixture of $H_2O$ and nitrogen, and a mixture of $CO_2$ and another inert gas, for example, at an elevated activating temperature in a $CO_2$ and/or $H_2O$-containing atmosphere. The atmosphere may be essentially pure $CO_2$ or $H_2O$ (steam), a mixture of $CO_2$ and $H_2O$, or a combination of $CO_2$ and/or $H_2O$ with an inert gas such as nitrogen and/or argon. A $CO_2$ and nitrogen mixture may be used, for example, with $CO_2$ content as low as 2% or more. Typically a mixture of $CO_2$ and nitrogen with a $CO_2$ content of 5-50% may be used to reduce process costs. The activating temperature can range from 600° C. to 1000° C., in certain embodiments from 600° C. to 900° C. During this step, part of the carbonaceous structure of the carbonized batch mixture body is mildly oxidized:

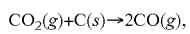

$$CO_2(g) + C(s) \rightarrow 2CO(g),$$

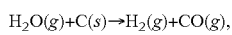

$$H_2O(g) + C(s) \rightarrow H_2(g) + CO(g),$$

resulting in the etching of the structure of the carbonaceous body and formation of an activated carbon matrix that can define a plurality of pores on a nanoscale and microscale. The activating conditions (time, temperature, and atmosphere) can be adjusted to produce the final product with the desired specific area.

The flow-through substrate may be formed using any suitable technique. In one embodiment, the batch mixture can be formed into a shape, for example, a honeycomb, by any appropriate technique, such as by extrusion. Extrusion can be done by using standard extruders (ram extruder, single-screw, double-screw, and the like) and custom extrusion dies, to make honeycombs with various shapes and geometries. Example flow-through substrates and extrusion techniques are disclosed is U.S. Pat. Nos. 5,820,967 and 6,187,713, the contents of them being incorporated by reference herein.

The additive capable of enhancing the sorption of $CO_2$ on the sorbent structure may be applied to the flow-through substrate using any suitable technique. Examples include nitration-amination, amino-silane grafting, washcoating, and a diazonium process.

In one embodiment, the additive is provided using a nitration-amination process. The activated carbon body is treated with concentrated sulfuric acid and nitric acid, introducing nitro groups (—$NO_2$) onto the surface of the activated carbon body. The nitro groups are then reduced by the reaction of powdered iron and hydrochloric acid to produce amino groups.

In another embodiment, the additive may be provided using an amino-silane grafting process. Amino-silanes, for example, 3-aminopropyltrimethoxysilane, aminophenyltrimethoxysilane, and tris(dimethylamino)chlorosilane are grafted to an activated carbon body by soaking the body in an agitated solution containing 0.1 to 20 wt % of an amino silane. The activated carbon body comprising sorbed silane is then heated at a temperature in the range of 100° C. to 150° C. for 24 hours to graft the amino-silane to the surface.

In another embodiment, the additive may be provided via washcoating of a metal oxide, for example, transition metal oxides including zinc oxide, iron oxide, and copper oxide. The oxide is coated on the activated carbon body using a slurry comprising the transition metal oxide. In another embodiment, the additive may be provided via impregnation of one or more organic or inorganic salt solutions, for example transition metal salts, including zinc carbonate, iron acetate, and copper citrate. Other examples of organic or inorganic salt solutions include aqueous solutions of nitrates, acetates, oxalates, citrates, maleates, and succinates. The activated carbon body coated with a salt is then heated to a temperature in the range 30° C. to 900° C., to decompose the salt and remove the acid group.

In another embodiment, the additive may be provided using a diazonium process. Secondary or tertiary amine substituted or nitro-group substituted aniline reacts with sodium nitride ($NaNO_2$) forming diazonium, which is unstable and forms nitro-group substituted benzene radical. The radical group is very reactive and reacts with activated carbon immediately. Thus, the substituted benzene can be bound to the activated carbon body surface. The nitro group is reduced to an amine group by the reaction of powdered iron and hydrochloric acid. There is no need for further reaction of secondary and tertiary amine substituted benzene.

A third embodiment is a method of removing $CO_2$ from a gas that comprises providing the sorbent structure and contacting it with a gas comprising $CO_2$. For example, a gas stream may be passed through inner passageways of a flow-through substrate, such as a honeycomb, from the inlet end to the outlet end. The gas may also contain another phase, such as a solid particulate in a gas, or droplets of liquid in a gas stream. Example gas streams include a flue gas stream of a coal fired power plant, natural gas combine power plant, or other facility generating significant amounts of $CO_2$. The sorption of $CO_2$ may take place under any appropriate conditions. For example, in one embodiment, $CO_2$ sorption occurs at a temperature up to 80° C.

The terms "sorb," "sorption," and "sorbed," refer to the adsorption, absorption, or other entrapment of the $CO_2$ on the flow-through substrate, either physically, chemically, or both physically and chemically.

In some embodiments, the sorbent structure removes at least 50%, at least 70%, or at least 90% of $CO_2$ from the gas.

A fourth embodiment is a method of desorbing at least a portion of $CO_2$ from the sorbent structure, wherein the method comprises providing the sorbent structure having $CO_2$ sorbed thereon; and heating it to a temperature above the desorption temperature of the $CO_2$. Desorbing of the sorbed $CO_2$ may also be referred to as regeneration of the sorbent structure. The sorbent structure can be heated by any appropriate method. For example, in one embodiment the sorbent structure can be heated by a flow of hot inert gas such as nitrogen. Alternatively, the flow of inert gas can comprise one or more flue gases obtained from a combustion system. Thermal swing adsorption (TSA), for example, may be used, and involves use of a lower temperature for adsorption and a higher temperature for desorption. In another embodiment, the sorbent structure can be heated by passing a sufficient voltage across a portion of the sorbent structure to provide resistive heating of the sorbent structure, also known as electric swing adsorption (ESA). Still further, the sorbent structure can be heated by a conventional furnace or oven.

It should be appreciated that a sufficient temperature to desorb the $CO_2$ will depend, in part, on the amount of $CO_2$ that is present. In one embodiment, a sufficient temperature can comprise heating the sorbent structure at a temperature in the range of from 50° C. to 300° C., including, for example, temperatures of 100° C., 150° C., 180° C. or 200° C. In another embodiment, the sufficient heating temperature can be in the range derived from these values, including for example, a range from 90° C. to 200° C., or 90° C. to 180° C.

As mentioned above, ESA is one regeneration technique that takes advantage of the conductive properties of the activated carbon body, and involves passing a current through the carbon body. U.S. Pat. No. 6,097,011 describes some example methods and materials for such a technique and is herein incorporated by reference. ESA is more energy efficient that TSA because more ESA energy is directly absorbed for breaking the sorbent —$CO_2$ bonding. With the passage of an electric current through the carbon, the carbon heats up to a predetermined temperature depending on the resistance of the body and the voltage applied. Conductors are positioned so as to be able to conduct an electric current through the sorbent structure, ideally heating it uniformly. The actual positioning of the conductors depends on the type of conductors and on the geometry of the device. The invention is not limited to any specific type of conductors or geometry; but desirably the current generates uniform heating of the device without hot spots.

The voltage and current requirement will vary depending on the application and the resistivity can be adjusted as desired according to the following equation $$\rho = \frac{R \cdot A}{L}$$

where $\rho$ is resistivity in ohm-cm, R is resistance in ohms, A is the area of a conducting surface in $cm^2$ and L is the distance between two conducting surfaces in cm.

Figure 3:
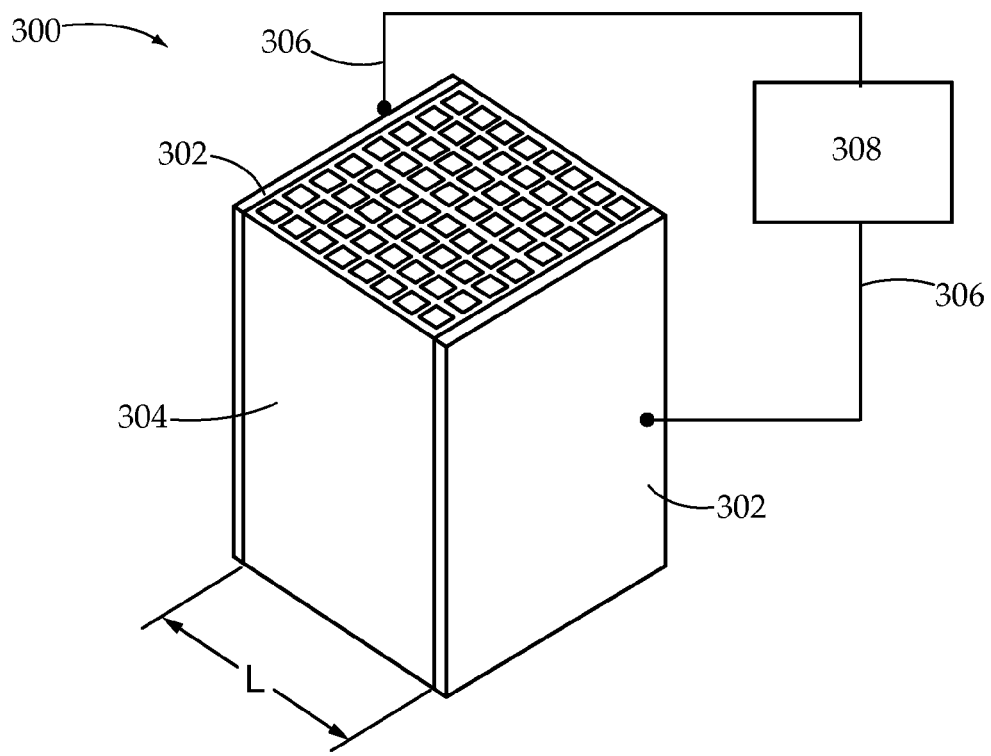
FIG. 3 is an embodiment of a sorbent structure configured for ESA desorption of $CO_2$ from the sorbent structure.

One embodiment of a sorbent structure configured for ESA desorption 300 is illustrated in FIG. 3, wherein a conducting metal 302 is applied to opposing surfaces of the sorbent structure 304. By opposing surfaces is meant surfaces that are so spaced according to the geometry of the body that passage of current between the conductive surfaces produces a current that heats the carbon uniformly. Leads 306 are shown connecting the metal coated sides 302 with a power supply 308. For measuring resistivity, the distance between conducting surfaces 302 is shown as L, and the area of a conducting surface would be the area of one side 302.

Examples of conducting materials are metals as copper, silver, aluminum, zinc, nickel, lead, tin, and their alloys, especially copper because of its high conductivity which minimizes resistance.

The conductors are typically either in the form of a strip of conducting material or electrode or a coating of conductive material on the sorbent structure. If an electrode is used, it can be applied by pressure contact e. g., a spring. Or a strip of conducting metal can be used and be attached to the sorbent structure by an electrically conducting adhesive such as e. g., silver-containing epoxies such as E-solder #3012 and #3021 from Acme Chemicals and Insulation Co.

A conductive coating is cost effective and gives a uniform resistance path so as to avoid hot spots.

Once at least a portion of the sorbed $CO_2$ has been chemically and/or physically desorbed from the activated carbon sorbent structure, the desorbed $CO_2$ can be separated from the sorbent structure by a waste stream. In one embodiment, a suitable waste stream for conveying the desorbed $CO_2$ can comprise a flow of inert gas, such as nitrogen. Still further, the waste stream containing at least a portion of the desorbed $CO_2$ can, if desired, be conveyed to a $CO_2$ collection device for subsequent remediation or collection of the desorbed $CO_2$. Any $CO_2$ desorbed from the sorbent structure can be recovered in a secondary system for later containment through other storage mechanisms or processes.

Any sorbent structures of the invention, such as honeycombs, may be incorporated into or used in any appropriate system environments. For example, a process stream of a coal fired plant or natural gas combined cycle power plant.

The sorbent structure can be placed after particulate matter control and before the stack. If an $SO_2$ control system is in place, the sorbent structure can be placed after the $SO_2$ control system.

Any one of the above-mentioned sorbent structures can be incorporated into a system configuration for $CO_2$ removal and sorbent regeneration. For example, FIGS. 1A, 1B and 2 illustrate a non-interruptive and, if desired, automated regeneration of a sorbent structure without requiring a significant shut down or interruption of a process stream in which the sorbent structure is being used.

FIG. 1A illustrates one embodiment including a system 100 of two sorbent structures [102 and 104] that is capable of selectively directing the flow of gas via different flow paths [108 and 110] to a particular sorbent structure using, for example, a baffle or shutter valve 112. One sorbent structure 104 may be removing $CO_2$ from the $CO_2$ containing gas 106, while the remaining sorbent structure 102 is regenerating, or is ready for $CO_2$ sorption. After passing through the sorbent structure 104, the gas stream continues through the stack 116. After passing through the sorbent structure 102, the gas stream may be sent to a $CO_2$ collection system 114.

Figure 1B:
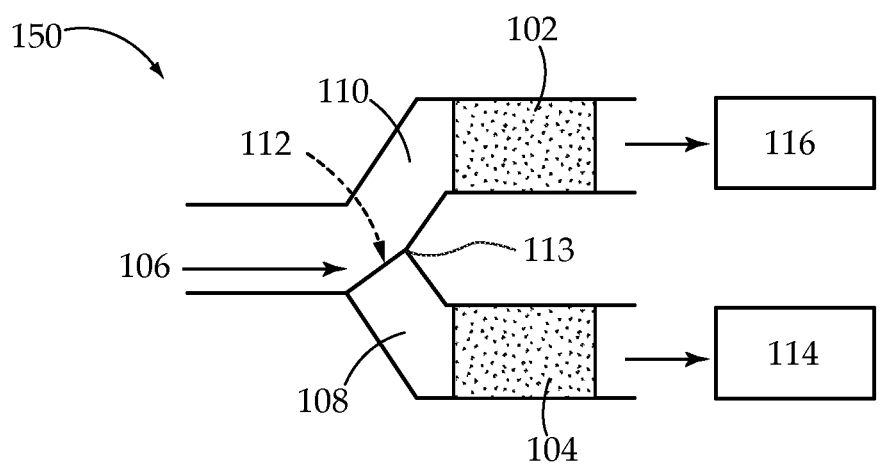
FIG. 1B is an alternative embodiment of a system configuration for $CO_2$ removal and sorbent regeneration.

FIG. 1B illustrates a system 150 configured with sorbent structure 102 removing $CO_2$ from the $CO_2$ containing gas 106, while the remaining sorbent structure 104 is regenerating as described above, or is ready for $CO_2$ sorption. After passing through the sorbent structure 102, the gas stream continues through the stack 116. After passing through the sorbent structure 104, the gas stream may be sent to a $CO_2$ collection system 114.

Figure 2:
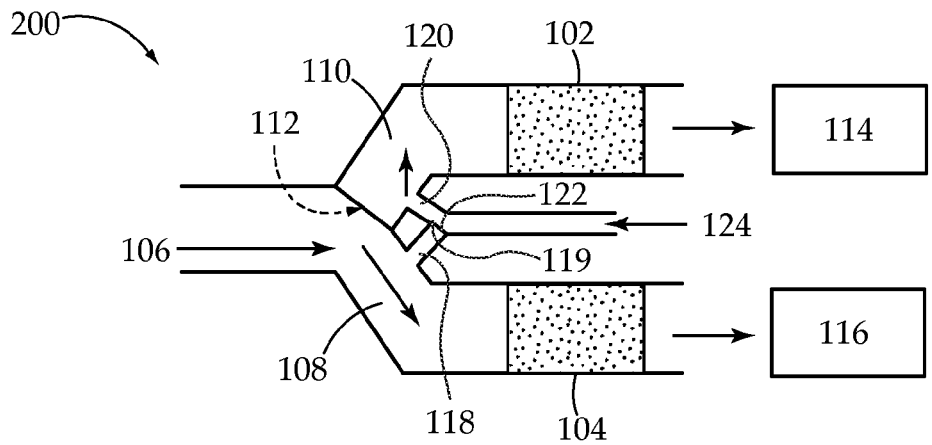
FIG. 2 is a further embodiment of a system configuration for $CO_2$ removal and sorbent regeneration.

FIG. 2 illustrates a $CO_2$ removal system 200 showing different flow paths [118 and 120] for a gas stream 124 for conveying the desorbed $CO_2$. The path of the gas stream is controlled through, for example, a baffle or shutter valve 122 rotatable around a pivot point 119; and directed to the sorbent structure in regeneration. The gas stream 124 may be, for example, a hot inert gas used for example, for thermal desorption of the $CO_2$ from the sorbent structure as described above. Alternatively this stream 124 may be simply a carrier gas for $CO_2$ desorbed using an ESA technique discussed above.

FIGS. 1A, 1B and 2 show embodiments with a shutter [112 and 122], rotatable around a pivot point [113 and 119], but any appropriate flow control mechanism, such as valves in appropriate positions, may be used.

It should be understood that while the invention has been described in detail with respect to certain illustrative embodiments thereof, it should not be considered limited to such, as numerous modifications are possible without departing from the broad spirit and scope of the invention as defined in the appended claims.

Unless otherwise indicated, all numbers used in the specification and claims are to be understood as being modified in all instances by the term "about," whether or not so stated. It should also be understood that the precise numerical values used in the specification and claims form additional embodiments of the invention.

What is claimed is:

1. A sorbent structure comprising:
   a continuous activated carbon body in the form of a flow-through substrate comprised of at least one cell defined by at least one porous wall;
   wherein the carbon body comprises an electrically conducting dopant material, wherein the dopant is present within the at least one porous wall, and
   wherein the temperature of said sorbent structure may be controlled by conduction of an electrical current through said electrically conducting dopant; and
   an additive provided on the flow-through substrate,
   wherein the additive is capable of enhancing the sorption of $CO_2$ on the sorbent structure.

2. A sorbent structure of claim 1, wherein the flow-through substrate is a honeycomb.

3. A sorbent structure of claim 1, wherein the flow-through substrate comprises a surface having a surface area of 100 $m^2/g$ or more.

4. A sorbent structure of claim 1, wherein the flow-through substrate comprises a total pore volume wherein at least 20% of the total pore volume is comprised of pores having a pore diameter of 5 nm or more.

5. A sorbent structure of claim 1, wherein the additive is a base.

6. A sorbent structure of claim 5, wherein the additive is an organic amine.

7. A sorbent structure of claim 5, wherein the additive is an inorganic amine.

8. A sorbent structure of claim 1, wherein the additive is organic.

9. A sorbent structure of claim 1, wherein the additive is inorganic.

10. A sorbent structure of claim 1, wherein the additive is provided as a coating on the flow-through substrate.

11. A sorbent structure of claim 1, wherein the flow-through substrate further comprises a filler.

12. A sorbent structure of claim 11, wherein the filler is coal or charcoal.

13. A method of making a sorbent structure of claim 1 comprising:
   providing a continuous activated carbon body in the form of a flow-through substrate; and applying to the flow-through substrate an additive, wherein the additive is capable of enhancing the sorption of $CO_2$ on the sorbent structure.

14. A method according to claim 13, wherein the continuous activated carbon body is provided by:
   forming a carbon precursor into the shape of a flow-through substrate;
   optionally curing the carbon precursor;
   carbonizing the carbon precursor to form a continuous structure of carbon; and
   activating the carbon.

15. A method according to claim 14, wherein the carbon precursor is a phenolic resin.

16. A method of removing $CO_2$ from a gas, the method comprising:
   providing a sorbent structure of claim 1; and
   contacting the sorbent structure with a gas comprising $CO_2$.

17. A method according to claim 16, wherein the gas is at a temperature of up to 80° C.

18. A method of desorbing at least a portion of $CO_2$ from a sorbent structure, the method comprising:
   providing a sorbent structure of claim 1 having $CO_2$ sorbed thereon; and
   heating the sorbent structure to a temperature above the desorption temperature of the $CO_2$.

19. A method according to claim 18, which comprises heating the sorbent structure to a temperature of 50° C. or above.

20. A method according to claim 18, which comprises heating the sorbent structure with a flow of inert gas.

21. A method according to claim 18, which comprises heating the sorbent structure by passing a current through the sorbent structure to provide resistive heating.

22. A method according to claim 18, which comprises heating the sorbent structure in a furnace or an oven.

23. A method according to claim 18, further comprising collecting the desorbed $CO_2$.

* * * * *